Samuel F. Kennedy
INVENTOR.

United States Patent Office 2,782,903
Patented Feb. 26, 1957

2,782,903

GRAIN AUGER

Samuel F. Kennedy, Taylorville, Ill.

Application March 1, 1954, Serial No. 412,982

1 Claim. (Cl. 198—213)

This invention relates to an attachment for a portable hand drill for converting the portable hand drill to a conveyor especially adapted to move and convey shelled corn, small grains, ground feeds, and the like from one location to another in a comparatively rapid and convenient manner.

The primary object of the present invention resides in the provision of means adapted to be associated with a portable hand drill or like tool so that the motor power supplied by the portable tool can be utilized in withdrawing grain and feed from a bin or vehicle to another location.

A further object of the present invention resides in the provision of a grain auger adapted to be associated with a portable hand rotary tool so as to utilize a conveyor screw for withdrawing grain, feed, and other granulated materials from one location to another.

The construction of this invention teaches a tool having a discharge port at one end thereof which extends perpendicularly relative to the axis of the tool so that the conveyor screw may withdraw the material through an open outlet end and discharge it downwardly into a grain sack or other container such as a feed trough or grinder or the like.

Still further objects and features of this invention reside in the provision of a grain auger that is strong and durable, simple in construction and manufacture, provided with a novel torque arm which is slidably adjustable relative to the power tool so as to enable various sizes and makes of power tools to be suitably supported, yet which is extremely light in weight and inexpensive to construct thereby permitting wide application.

These, together with the various ancillary objects and features of the invention which will become apparent as the following description proceeds, are attained by this grain auger, a preferred embodiment of which has been illustrated in the accompanying drawings, by way of example only, wherein.

Figure 1:
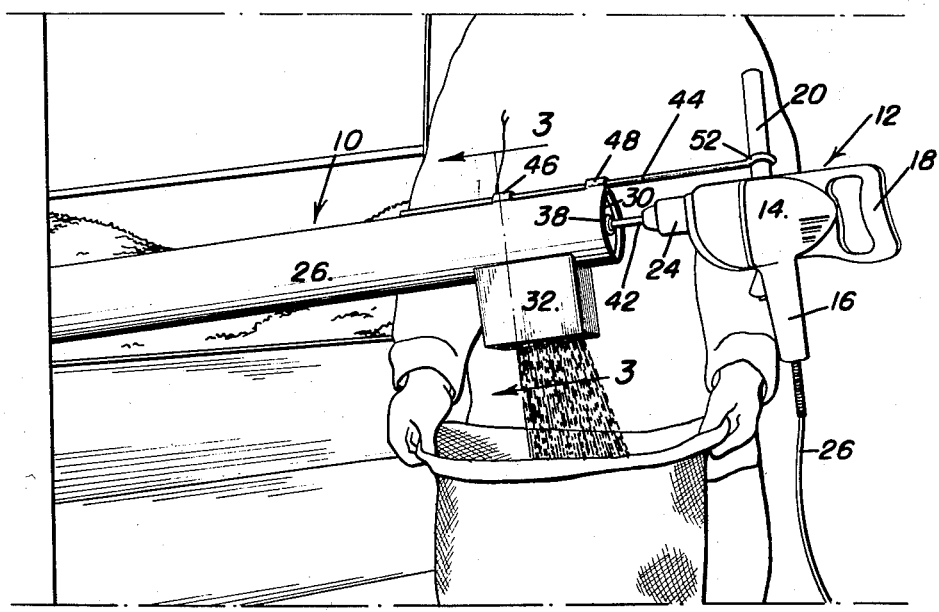
Figure 1 is a perspective view illustrating the grain auger comprising the present invention as operatively associated with a portable hand rotary power tool.
Figure 2:
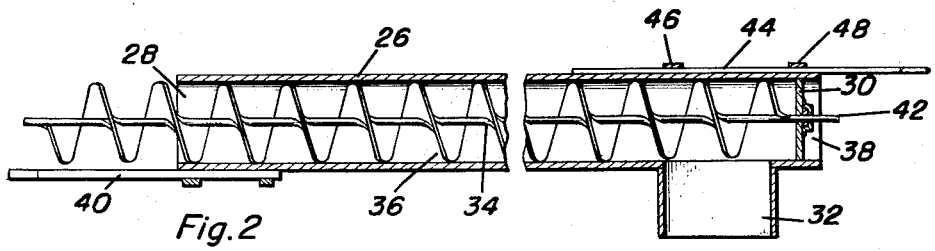
Figure 2 is a longitudinal sectional view of the grain auger.
Figure 3:
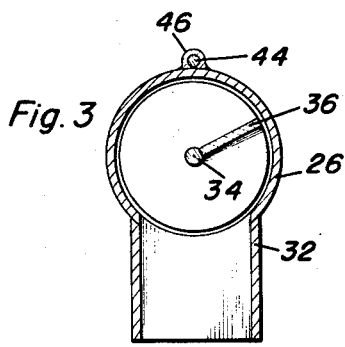
Figure 3 is a vertical sectional view as taken along the plane of line 3—3 in Figure 1.

With continuing reference to the accompanying drawings wherein like reference numerals designate similar parts throughout the various views, the reference numeral 10 generally designates the grain auger comprising the present invention which is adapted to be associated with a portable hand rotary tool generally designated by reference numeral 12. The portable hand tool 12 is provided with a suitable electric motor mounted in the body 14 of the tool. A handle 16 as well as a guide grip 18 is normally provided for the power tool 12 and a further handle 20 may be welded or otherwise affixed, if not originally provided for the tool 12 to the body 14. This handle 20 extends perpendicularly to the axis of the drive chuck 24 which is rotated by the motor of the tool. The motor 12 may be any conventional electric motor powered through suitable conductors 26 which are adapted to be connected to a source of electrical power (not shown).

The auger 10 comprises a hollow cylindrical tube 26 which has an open intake end 28. An end wall 30 closes the other end of the tube 26. Extending perpendicularly relative to the axis of the tube 26 is a discharge spout 32 which extends downwardly from the tube 26 for directing the flow of grain from the grain auger 10. The shaft 34 of a conveyor screw 36 is journalled in a bearing assembly 38 of any suitable construction in the end wall 30 and extends outwardly through and beyond the intake end 28 of the tube 26 so as to direct grain, feed or other material into the tube 26 and thence through the tube out the discharge spout 32. A guard 40 is affixed to the tube 26 beneath the screw conveyor 36 so as to guard the free end of the screw conveyor 36 and provide a rest, if such is necessary, for the outer end of the grain auger 10.

The inner end of the shaft 34 extends as at 42 beyond the end wall 30 for engagement with the chuck 24. This end 42 of the shaft 34 may be of such shape that it can be securely gripped by the chuck 24 for rotation of the shaft 34 and hence the screw conveyor 36.

The portable hand rotary power tool 12 is held onto the grain auger 10 by means of the connection between the chuck 24 and the end 42 of the shaft 34 as well as by a torque rod 44 which is adapted to hold the handle 20 of the power tool 12 in a fixed position while the shaft 34 is being rotated. This torque arm 44 is adapted to be received in guide brackets 46 and 48 affixed to the upper surface of the tube 26 opposite the chute 32. Apertures are formed in the guide brackets 46 and 48 and are aligned with each other for reception of the torque arm 44. The torque arm 44 is therefore slidably adjustable relative to the tube 26 and is provided with an eye portion 52 adapted to be received over the handle 20.

The operation of this grain auger is quite simple. After the tube 26 has been positioned in a desired manner with the intake end 28 of the tube 26 directed into the material to be handled, the portable hand rotary power tool 12 can then be affixed to the auger 10 with the eye 52 received over the handle 20. Then, inserting the torque arm 44 into the guide brackets 48 and 46 the chuck 24 can be adjusted over the end 42 of the shaft 34. After the chuck 24 has been secured to the end 42 the electric motor in the body 14 may be started and the screw conveyor 36 will then withdraw grain from its initial location and discharge it through the chute 32.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

An auger for conveying grain for use in combination with a portable hand rotary power tool having a drive chuck and at least one handle extending substantially perpendicular to said drive chuck, said auger comprising a tube having an open intake end, the other end of said tube having a closed end wall, an outlet in communication with said tube, a screw conveyor journalled in said end wall and extending through and beyond said intake end, a torque arm engageable with the handle of the rotary tool, and means adjustably supporting the torque arm on said tube, said means including at least one guide bracket on said tube, each of said brackets having aligned apertures therethrough, said torque arm being slidably adjustably received in said aperture in said bracket, said torque arm having an eye at one end thereof receivable over said handle.

References Cited in the file of this patent

UNITED STATES PATENTS

| | | |
|---|---|---|
| 1,067,500 | Bondy | July 15, 1913 |
| 1,131,558 | Schnell | Mar. 9, 1915 |
| 2,528,917 | Slocum | Nov. 7, 1950 |